(12) United States Patent
Aoki et al.

(10) Patent No.: US 6,312,035 B1
(45) Date of Patent: Nov. 6, 2001

(54) ELECTRIC VEHICLE

(75) Inventors: Shigeru Aoki; Masanori Shin, both of Wako (JP)

(73) Assignee: Honda Giken Kogyo Kabushiki Kaisha (JP)

(*) Notice: Subject to any disclaimer, the term of this patent is extended or adjusted under 35 U.S.C. 154(b) by 0 days.

(21) Appl. No.: 09/483,729

(22) Filed: Jan. 14, 2000

(30) Foreign Application Priority Data

Jan. 18, 1999 (JP) .................................................. 11-009863

(51) Int. Cl.⁷ ................................. B60K 1/04; A61G 5/04
(52) U.S. Cl. ........................... 296/37.1; 16/361; 16/371; 16/374; 220/812; 220/832; 220/836
(58) Field of Search ........................ 296/37.1, 76; 16/82, 16/361, 371, 374; 220/832, 831, 834, 836, 811, 812, 824

(56) References Cited

U.S. PATENT DOCUMENTS

| | | |
|---|---|---|
| 1,815,656 * | 7/1931 | McMurray . |
| 2,039,124 * | 4/1936 | Stryker .................................... 296/76 |
| 2,069,345 * | 2/1937 | Widman . |
| 2,320,752 * | 6/1943 | Roethel ................................. 296/76 |
| 2,639,462 * | 5/1953 | Fish ................................. 296/76 X |
| 2,647,788 * | 8/1953 | Kaiser et al. ...................... 296/76 X |
| 4,069,550 | 1/1978 | Silk et al. .............................. 16/179 |
| 4,530,412 | 7/1985 | Sigety, Jr. ......................... 180/69.21 |
| 4,712,828 * | 12/1987 | Albrecht .............................. 296/76 X |
| 5,050,270 * | 9/1991 | Burgei et al. . |
| 5,195,796 * | 3/1993 | Wampler, II ........................... 296/76 |
| 6,129,401 * | 10/2000 | Neag et al. . |

FOREIGN PATENT DOCUMENTS

| | | | |
|---|---|---|---|
| 2223208 * | 11/1973 | (DE) | ........................................ 296/76 |
| 0015117 * | 9/1980 | (EP) | .................................... 296/37.1 |
| 0139451 * | 6/1991 | (JP) | .................................... 296/37.1 |
| 7213560 | 8/1995 | (JP) . | |

* cited by examiner

Primary Examiner—Joseph D. Pape
Assistant Examiner—Patricia Engle
(74) Attorney, Agent, or Firm—Adams & Wilks

(57) ABSTRACT

An electric vehicle body has a curved portion provided with an opening. A storage compartment communicates with an inside of the body through the opening. A lid is disposed along the curved surface of the body to pivot about hinges to open and close the storage compartment. In one embodiment, each hinge includes a hinge pin provided on a side wall of the lid and a slotted aperture formed in a side wall of the storage box. The hinge pin is fitted into the long aperture in such a manner as to rotate and slide within the slotted aperture. As the lid is being opened, an edge of the rear cover proximate the lid comes into abutment with an edge of the lid to push the lid and hinge pin along a longitudinal direction of the long aperture.

15 Claims, 12 Drawing Sheets

ELECTRIC VEHICLE

BACKGROUND OF THE INVENTION

1. Field of the Invention

The present invention relates generally to an electric vehicle having a battery as a drive source for the propulsion of the vehicle and, in particular, to a mounting arrangement of a lid for a storage box attached to a cover member of the vehicle.

2. Description of the Related Art

In recent years, three- or four-wheeled vehicles having a battery as a drive source for the propulsion of the vehicle have become popular. Such electrically-propelled vehicles are in widespread use among elderly people, for instance because they travel at nearly a walking speed and are easy to operate. One example of such electrically-propelled vehicles is proposed in Japanese Patent Laid-Open Publication No. HEI-7-213560.

The proposed electrically-propelled vehicle includes a rear cover for covering a rear part of a vehicle body thereof. A charger is accommodated within the rear cover having an opened portion formed therein. The opened portion is opened and closed by a rear cover lid which is made of a flexible material. The rear cover lid includes a proximal end having a thin cutout portion formed therein for serving as a hinge. The rear cover lid is provided in such a manner as to pivot about the hinge, thereby opening and closing the opened portion of the rear cover.

The rear cover of the electrically-propelled vehicle as described above is of squarish contour. However, in recent years, there has been an increased demand for electrically-propelled vehicles having a cover of curved configuration. One example of such a curved cover is illustrated in FIG. 14A. The curved cover shown in FIG. 14A may have hinges 103a, 103b as illustrated in FIGS. 14B and 14C.

As shown in FIG. 14A, a cover 100 includes a surface convexly extending from a right side thereof through a lateral center of the electrically-propelled vehicle to a left side thereof. Also, such a surface convexly extends in a longitudinal direction of the electrically-propelled vehicle. The cover 100 has a generally rectangular opened portion 101 formed therein. A lid 102 conforms in contour to the opened portion 101 and is attached to the cover 100 in such a manner as to pivot about two hinges 103, 103, thereby opening and closing the opened portion 101.

The lid 102 pivotable about the hinges 103, 103 includes a lid edge 104 provided proximally thereof. Among edges defining the opened portion 101 is an opening edge 105 opposed to the lid edge 104. The cover 100 includes a storage box 106 formed below the opened portion 101 as shown in FIGS. 14B and 14C.

FIGS. 14B and 14C show example hinge constructions 103a, 103b for use as the hinges 103, 103.

The hinge 103a illustrated in FIG. 14B includes a hinge pin 112 positioned outside the storage box 106. More specifically, the hinge 103a has a circular hinge arm 111 including one end attached to an inner surface of the lid 102, and another end mounted on the hinge pin 112. The lid 102 pivots about the hinge pin 112 to thereby open and close the opened portion 101.

The hinge 103b shown in FIG. 14C includes a hinge pin 116 positioned within the storage box 106. The hinge 103b has a short hinge arm 115 provided on an inner surface of the lid 102. The short hinge arm 115 is rotatably connected to the hinge pin 116 provided on a side wall forming the storage box 106. As the hinge arm 115 rotates about the hinge pin 116, the lid 102 pivots about the hinge pin 116 to thereby open and close the opened portion 101.

However, the long hinge arm 111 required to provide the hinge 103a as illustrated in FIG. 14B is uneconomical. Moreover, it becomes necessary that a large hole 113 through which the hinge arm 111 extends is formed in a side wall of the storage box 106. This leaves room for improving the hinge 103a.

The hinge 103b in FIG. 14C employing the short hinge arm 115 is economical. Additionally, such a hinge 113b can be provided without forming any hole in the side wall of the storage box 106. However, so as to provide smooth pivotal movement of the lid 102 about the hinge pin 116, the lid edge 104 provided proximally of the lid 102 should not interfere with the opening edge 105 forming the opened portion 101. For this reason, it is necessary to form a large gap between the lid edge 104 and the opening edge 105, as shown in FIG. 14C. Consequently, the electrically-propelled vehicle inevitably provides an unpleasant appearance. Also, provision of such a large gap makes poor waterproof property between the lid edge 104 and the opening edge 105.

SUMMARY OF THE INVENTION

An object of the present invention is to provide an electric vehicle having a hinge which is simplified in construction by eliminating the need for forming a large hole in a side wall of a storage box and which is designed such that a lid smoothly opens and closes an opened portion of a cover with a small gap provided between a lid edge and an opening edge to thereby provide an enhanced appearance to the electric vehicle and an improved waterproof property between the cover and the lid.

According to an aspect of the present invention, there is provided an electric vehicle propelled by an electric motor, which comprises: a cover member for covering a vehicle body frame of the vehicle to provide a vehicle body of the vehicle, the cover member including a bent surface forming therein an opened portion; a storage box provided in such a manner as to communicate with inside of the cover member through the opened portion; and a lid disposed along the bent surface of the cover member in such a manner as to open and close the opened portion by means of hinges; the hinges each including a hinge pin provided on a side part of the lid or on a side part of the storage box, and a long aperture formed in the side part of the storage box or in the side part of the lid, the long aperture extending along the lid and perpendicularly to the hinge pin, the hinge pin being fitted into the long aperture in such a manner as to rotate within the long aperture and slide in a longitudinal direction of the long aperture.

When the lid opens the opened portion, an edge provided proximally of the lid comes into abutment on an edge forming the opened portion to thereby push the lid towards a distal end portion of the lid. The hinge pin then slides in the longitudinal direction of the long aperture. At this time, a hinge center is also moved in the same direction as the hinge pin. Since the hinge center and the lid are simultaneously moved in the manner as stated above, the lid can smoothly open the opened portion with a small gap provided between the cover member and the edge provided proximally of the lid.

In a preferred form of the present invention, the side part of the storage box or the side part of the lid is provided with a stop locking portion for regulating a full open position of the lid, the side part of the lid or the side part of the storage box is provided with a stopper arm, the stopper arm having a stopper portion disposed to abut on the stop locking portion with the lid in the full open position, and the stop locking portion and the stopper portion cooperate with each other to set the full open position of the lid. Since the stopper portion is disposed to abut the stop locking portion as the opened portion is fully opened by the lid, the full open position of the lid is automatically determined.

In a further preferred form of the present invention, the stop locking portion is an edge forming a through hole through which the stopper arm passes, the stopper arm has a cam portion disposed to contact the edge forming the through hole as the lid closes the opened portion, and the edge contacts the cam portion as the lid closes the opened portion to push the lid towards a proximal end of the lid. Namely, the hinge center and the lid are moved towards the distal end portion of the lid as the lid opens the opened portion, and the cam portion abuts on the edge forming the through hole as the lid closes the opened portion to thereby move both the hinge center and the lid towards the proximal end of the lid.

In a still further preferred form of the present invention, the side part of the storage box or the side part of the lid forms thereat a retention locking portion, the side part of the lid or the side part of the storage box is provided with an elastically deformable retention arm, the retention arm having a retention portion elastically deformed to be locked by the retention locking portion as the lid opens the opened portion, and the retention portion is locked by the retention locking portion to cause the lid to keep the opened portion open.

BRIEF DESCRIPTION OF THE DRAWINGS

A preferred embodiment of the present invention will hereinafter be described in detail, by way of example only, with reference to the accompanying drawings, in which.

DETAILED DESCRIPTION OF THE PREFERRED EMBODIMENT

The following description is merely exemplary in nature and is in no way intended to limit the invention or its application or uses.

Figure 1:
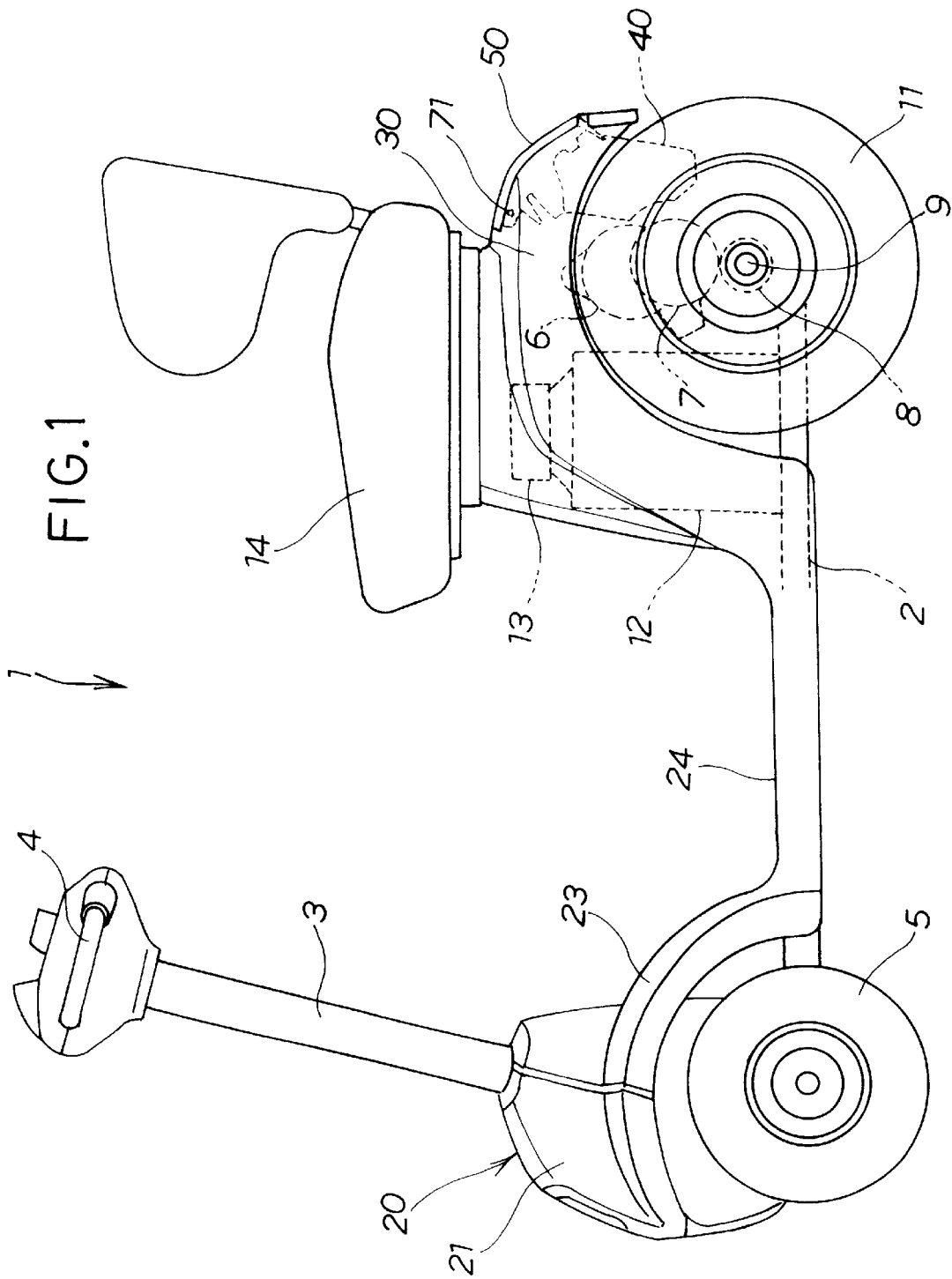
FIG. 1 is a side elevational view of an entire electric vehicle according to the present invention.

Referring to FIG. 1, one front wheel and one rear wheel of an electric vehicle 1 are illustrated because the vehicle 1 is shown in side elevation. However, the vehicle 1 shown in FIG. 1 is a four-wheeled vehicle having right and left front wheels 5, 5 and right and left rear wheels 11, 11 as viewed in a direction of movement of the vehicle 1.

The electric vehicle 1 includes a steering shaft 3 rotatably mounted on a front part of a vehicle body frame 2. An operating handle 4 is connected to an upper end of the steering shaft 3. A motor 6 for driving the rear wheels 11, 11 is mounted at a rear part of the vehicle body frame 2. The motor 6 is connected to a reducing mechanism 7 for reducing a rotational speed thereof. A differential gear 8 is connected to the reducing mechanism 7. Right and left rear wheel driving shafts 9 for driving the right and left rear wheels 11, 11, respectively, to rotate the same are connected to the differential gear 8. A battery 12 is carried on the rear part of the vehicle body frame 2. On an upper part of the battery 12, there is provided a controller 13. A seat 14 is positioned at an upper portion of the rear part of the vehicle body frame 2. The electric vehicle 1 includes a body cover 20 for covering the vehicle body frame 2.

The body cover 20 (cover member) includes a front cover 21 for covering the front part of the vehicle body frame 2, front fenders 23, 23 for covering upper portions of the front wheels 5, 5, a low step floor 24 on which a driver rests his feet, and a rear cover 30 extending backwardly from the step floor 24 to cover the motor 6, the reducing mechanism 7, the differential gear 8, the battery 12, and the controller 13. The rear cover 30 includes a storage box 40 provided at a rear portion thereof.

Figure 2:
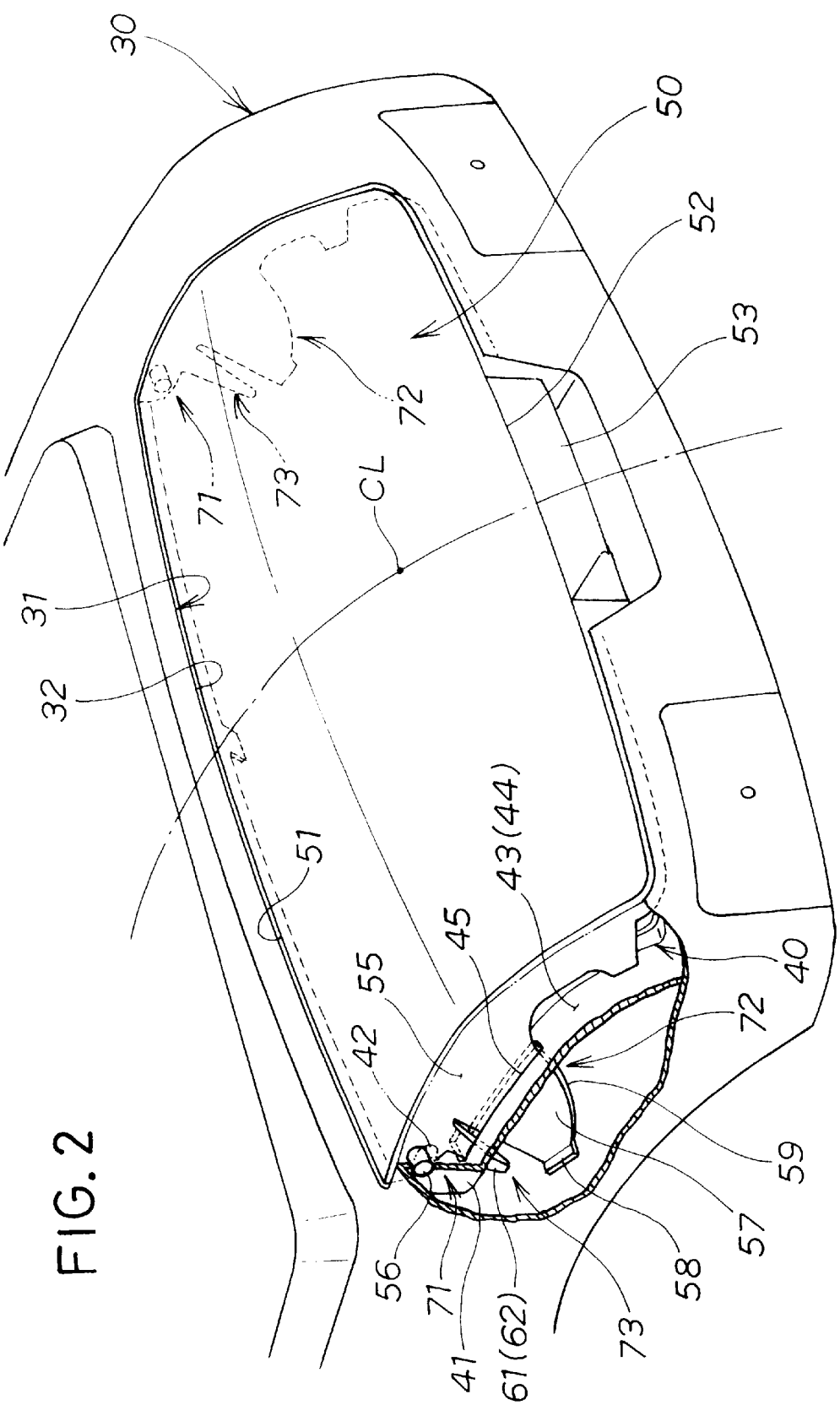
FIG. 2 is an enlarged perspective view of a rear cover including a lid shown in FIG. 1.

As shown in FIG. 2, the rear cover 30 includes a surface convexly extending from a left side part thereof through a laterally central portion of the vehicle (lateral center CL of the vehicle) to a right side part thereof. Such a surface convexly extends in a longitudinal direction of the vehicle 1. The rear cover 30 has a rectangular opened portion 31 elongated laterally of the vehicle 1. A lid 50 provided for opening and closing the opened portion 31 is mounted to the rear cover 30 through right and left hinges 71, 71.

The lid 50 pivots about the hinges 71, 71 to open and close the opening 31. The lid 50 includes a lid edge 51 proximally thereof. Among edges defining the opened portion 31 is an opening edge 32 opposed to the lid edge 51.

The rear cover 30 includes right and left stopper mechanisms 72, 72 for setting a full open position of the lid 50 in which the opened portion 31 is fully opened, and right and left retention mechanisms 73, 73 for keeping the lid 50 open.

Figure 3:
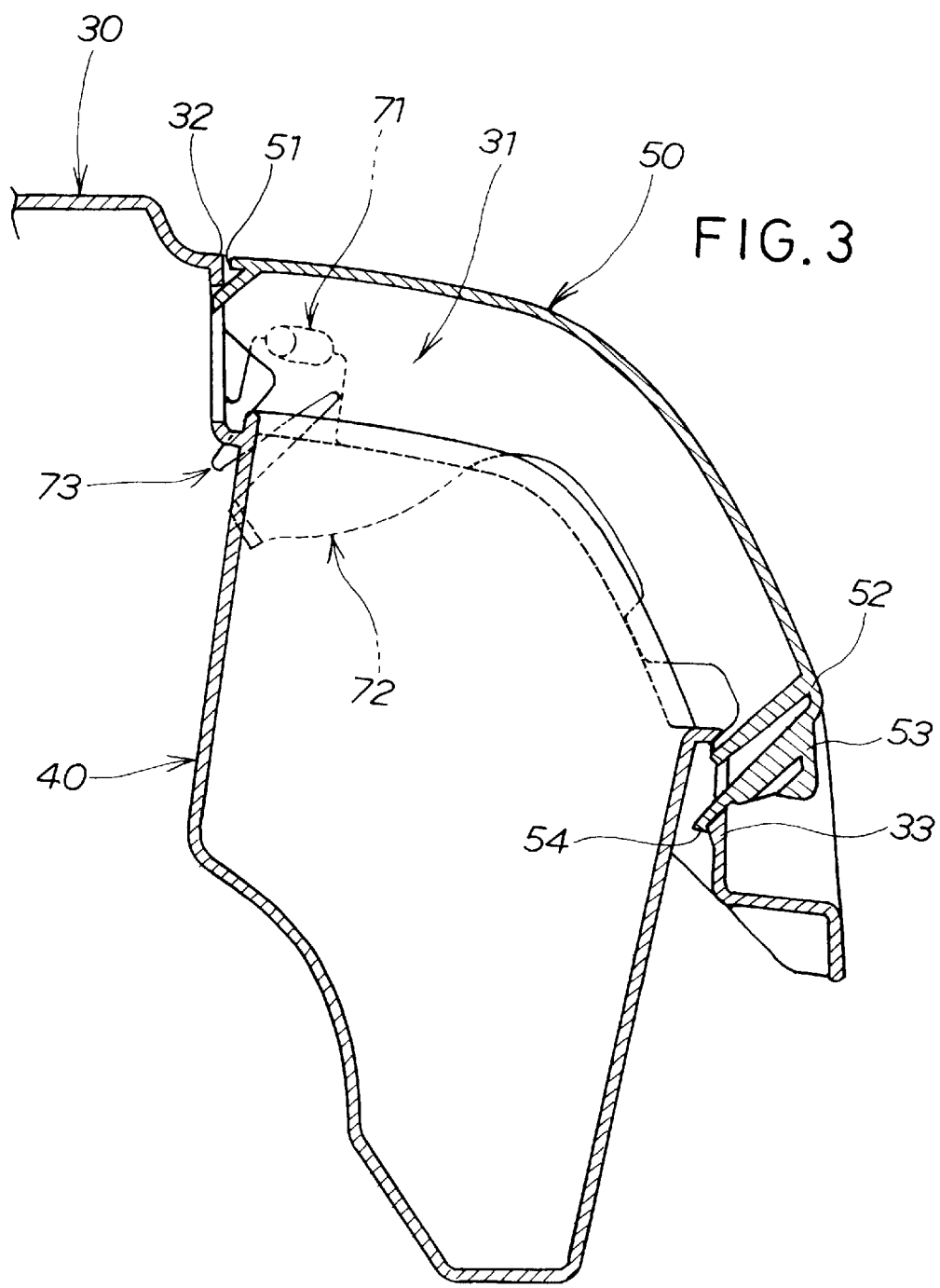
FIG. 3 is a vertical cross-sectional view of a central part of the rear cover including the lid shown in FIG. 2.

Referring to FIG. 3, the storage box 40 is disposed below the opened portion 31 formed in the rear cover 30 made of resin. The storage box 40 is formed integrally with the rear cover 30. More specifically, the storage box 40 is provided in such a manner as to communicate with the inside of the rear cover 30 through the opened portion 31. An opening of the storage box 40 is opened and closed by the lid 50.

The lid 50 made of resin includes a distal end portion 52. At the distal end portion 52, a knob 53 comprised of an elastic piece is formed integrally with the lid 50. The knob 53 includes a hook portion 54 at the end thereof. The hook portion 54 is elastically deformed to come into and out of engagement with a locking portion 33 provided on the rear cover 30. The hook portion 54 is snapped when engaged with the locking portion 33. Thus, the distal end portion 52 of the lid 50 can be locked by the locking portion 33 of the rear cover 30.

The hinge 71, the stopper mechanism 72, and the retention mechanism 73 will be explained with reference to FIG. 4 through FIG. 7.

The hinge 71 is provided at an upper part of the storage box 40. The hinge 71 is comprised of a hinge pin 56 provided on a side wall 55 of the lid 50 extending into the storage box 40, and a long aperture or slot 42 provided in a side wall 41 of the storage box 40. The long aperture 42 extends perpendicularly to an axial line of the hinge pin 56 and towards the distal end portion 52 provided at a rear portion backwardly of the lid 50. The hinge pin 56 is fitted into the long aperture 42 in such a manner as to rotate within the long aperture 42 and to move longitudinally of the long aperture 42. The long aperture 42 is a slot that is "long" in the sense that the hinge pin 56 is not only able to pivot therein but to slide from one end to the other.

Figure 14A:
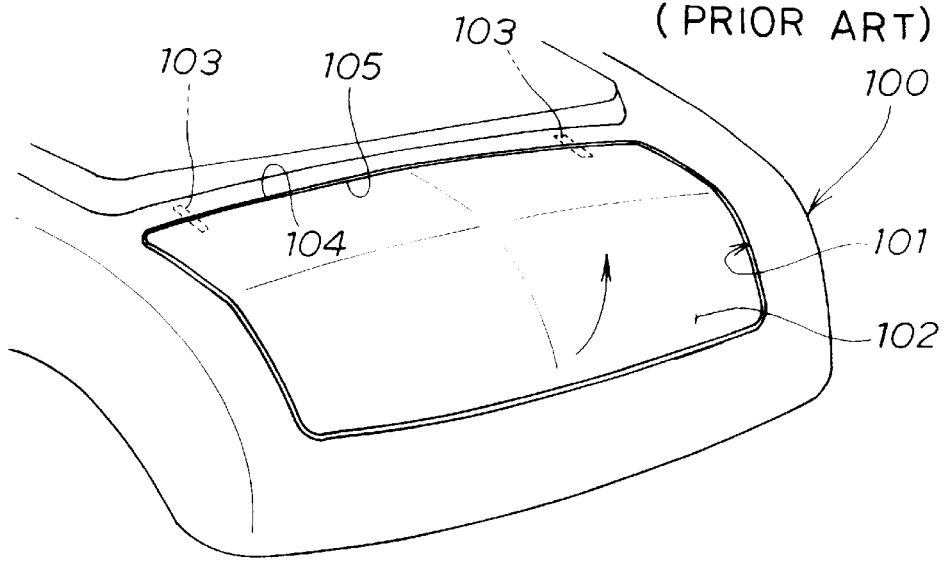
FIG. 14A shows relation between a rear cover and a lid of a conventional electrically-propelled vehicle.
Figure 14B:
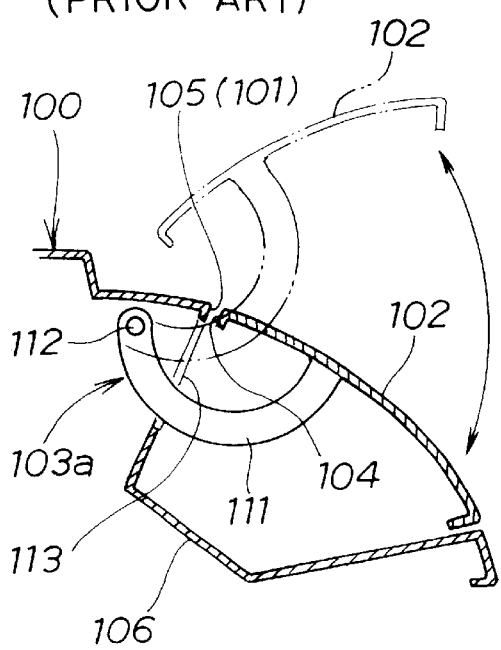
FIGS. 14B and 14C show the constructions of hinges of the rear cover shown in FIG. 14A.
Figure 14C:
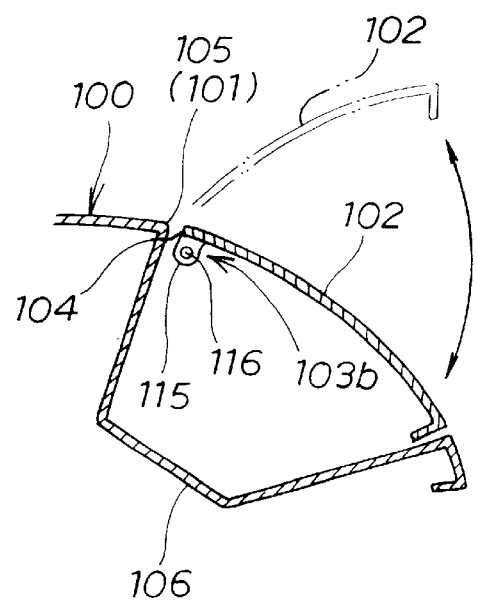

The thus arranged hinge 71 having such a long aperture 42 of small size formed in the side wall 41 of the storage box 40 becomes simpler in construction than the hinge 103a as shown in FIG. 14B. Thus, the rear cover 30 can be readily molded from resin by means of a simple mold.

Figure 4:
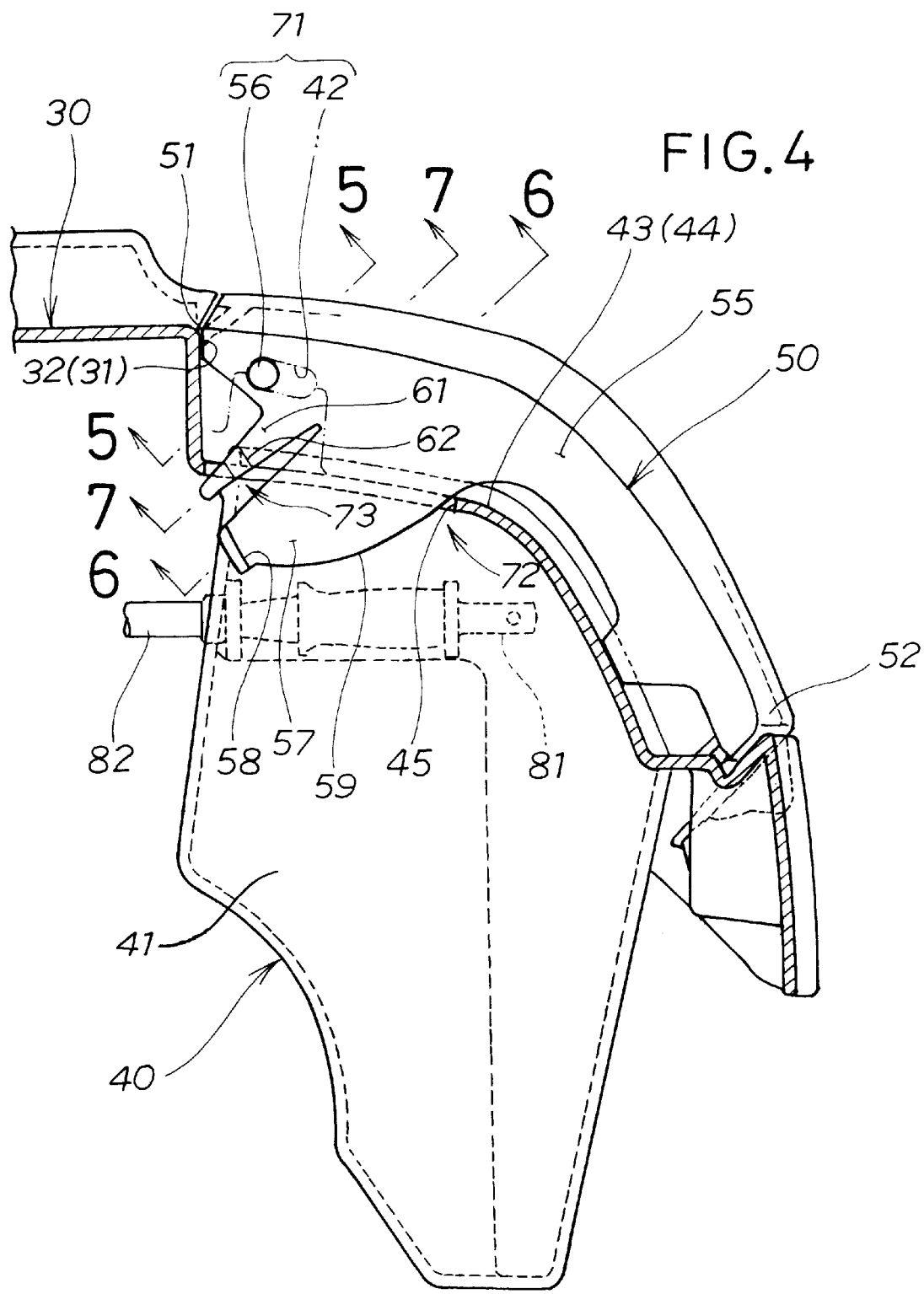
FIG. 4 is a side elevational view of the rear cover and the lid with the rear cover partially cut away.
Figure 5:
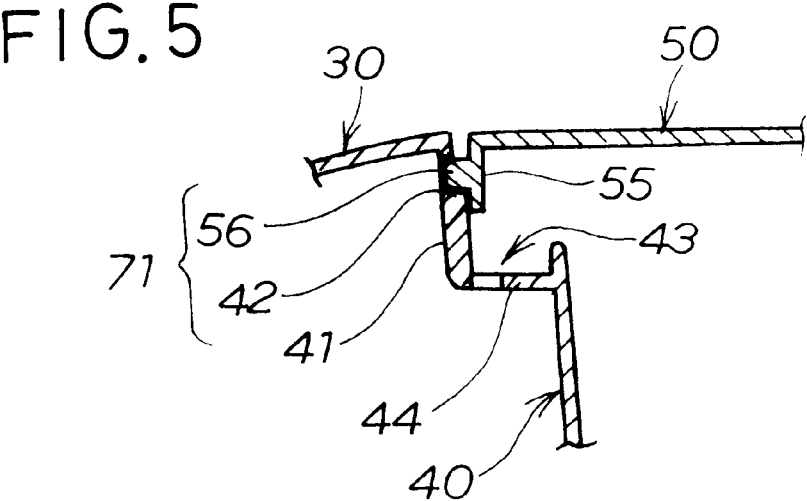
FIG. 5 is a cross-sectional view taken along line 5—5 of FIG. 4.

In FIG. 4, reference numeral 81 denotes an attachment plug for use in charging the battery. Designated by reference numeral 82 is an electric cord.

The stopper mechanism 72 and the retention mechanism 73 are provided in the proximity of the hinge 71. A narrow through hole 45 extends longitudinally of the electric vehicle 1 such that a stopper arm 57 and a retention arm 61 pass therethrough.

Figure 6:
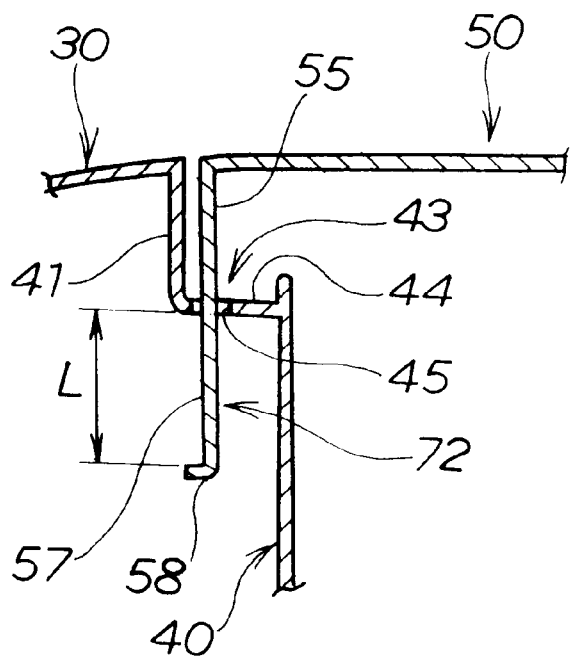
FIG. 6 is a cross-sectional view taken along line 6—6 of FIG. 4.

Turning to FIG. 6, the stopper mechanism 72 includes a step portion 43 formed at the side wall 41 of the storage box 40, the through hole 45 formed in a horizontal sheet 44 of the step portion 43, the stopper arm 57 extending from the side wall 55 of the lid 50 through the through hole 45, and an L-shaped stopper portion 58 formed at the end of the stopper arm 57. Since the stopper portion 58 is designed to abut on a lower surface of the horizontal sheet 44, the stopper arm 57 does not move out of the through hole 45. When the stopper portion 58 abuts on the lower surface of the horizontal sheet 44, the full open position of the lid 50 is set. The full open position of the lid 50 depends on a distance L between the lower surface of the horizontal sheet 44 and the stopper portion 58.

The stopper arm 57 has a cam portion 59 as shown in FIG. 4. The cam portion 59 comes into contact with one of the edges defining the through hole 45 as the lid 50 closes the opened portion 31. When the lid 50 closes the opened portion 31 to thereby bring the cam portion 59 into contact with such an edge, the cam portion 59 acts to push the lid 50 towards the opening edge 32.

Figure 7:
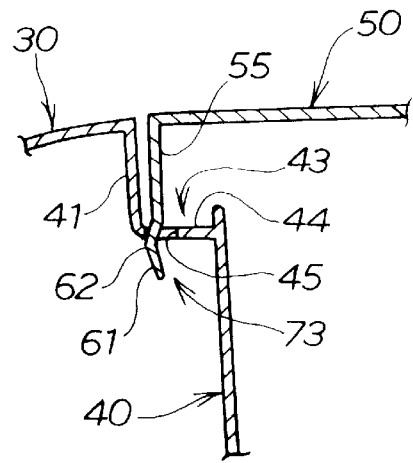
FIG. 7 is a cross-sectional view taken along line 7—7 of FIG. 4.

As shown in FIG. 7, the retention mechanism 73 includes the retention arm 61 extending from the side wall 55 of the lid 50 through the through hole 45, and a dog-legged retention portion 62 formed at a lower part of the retention arm 61. The retention portion 62 includes a projecting part designed to be locked by an edge forming the through hole 45. Because the projecting part of the retention portion 62 is locked by the edge, the lid 50 keeps the opened portion 31 open. The retention arm 61 is a sheet article elastically deformed such that the retention portion 62 is locked by the edge forming the through hole 45. More specifically, as the lid 50 opens the opened portion 31, the retention portion 62 is elastically deformed to be locked by the edge forming the through hole 45. The lid 50 thus keeps the opened portion 31 open. It will be appreciated that the edge forming the through hole 45 acts as a retention locking portion for locking the retention portion 62 such that the lid 50 keeps the opened portion 31 open.

Operations of the hinge 71, the stopper mechanism 72, and the retention mechanism 73 thus arranged will be described in relation to FIG. 8 through FIG. 10.

Figure 8:
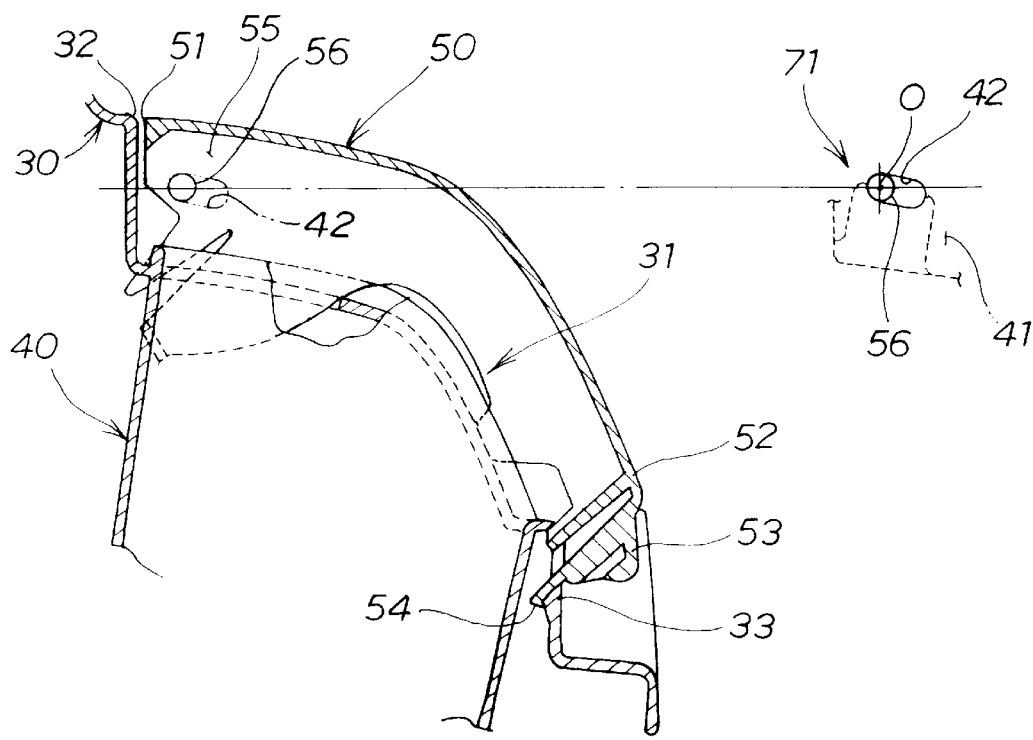
FIG. 8 shows a hinge center with the lid closing an opened portion of the rear cover.

FIG. 8 illustrates the lid 50 closing the opened portion 31. The hinge pin 56 is positioned forwardly of the long aperture 42. When the lid 50 of FIG. 8 pivots to open the opened portion 31, the lid edge 51 of the lid 50 comes into abutment on the opening edge 32 forming the opened portion 31. The lid 50 is then pushed rearwardly of the vehicle 1. As the lid 50 is pushed rearwardly of the vehicle 1 in the manner described above, the hinge pin 56 within the long aperture 42 is moved along the longitudinal direction of the long aperture 42. When the lid 50 is in the full open position, a hinge center O is positioned rearwardly of the long aperture 42, as shown in FIG. 9.

The lid edge 51 of the lid 50 interferes with the opening edge 32 forming the opened portion 31 as the lid 50 pivots to open the opened portion 31 while the hinge pin 56 is moved along the longitudinal direction of the long aperture 42. It therefore becomes possible for the lid 50 to smoothly open the opened portion 31 without exerting an excessive force on the opening edge 32.

Figure 10:
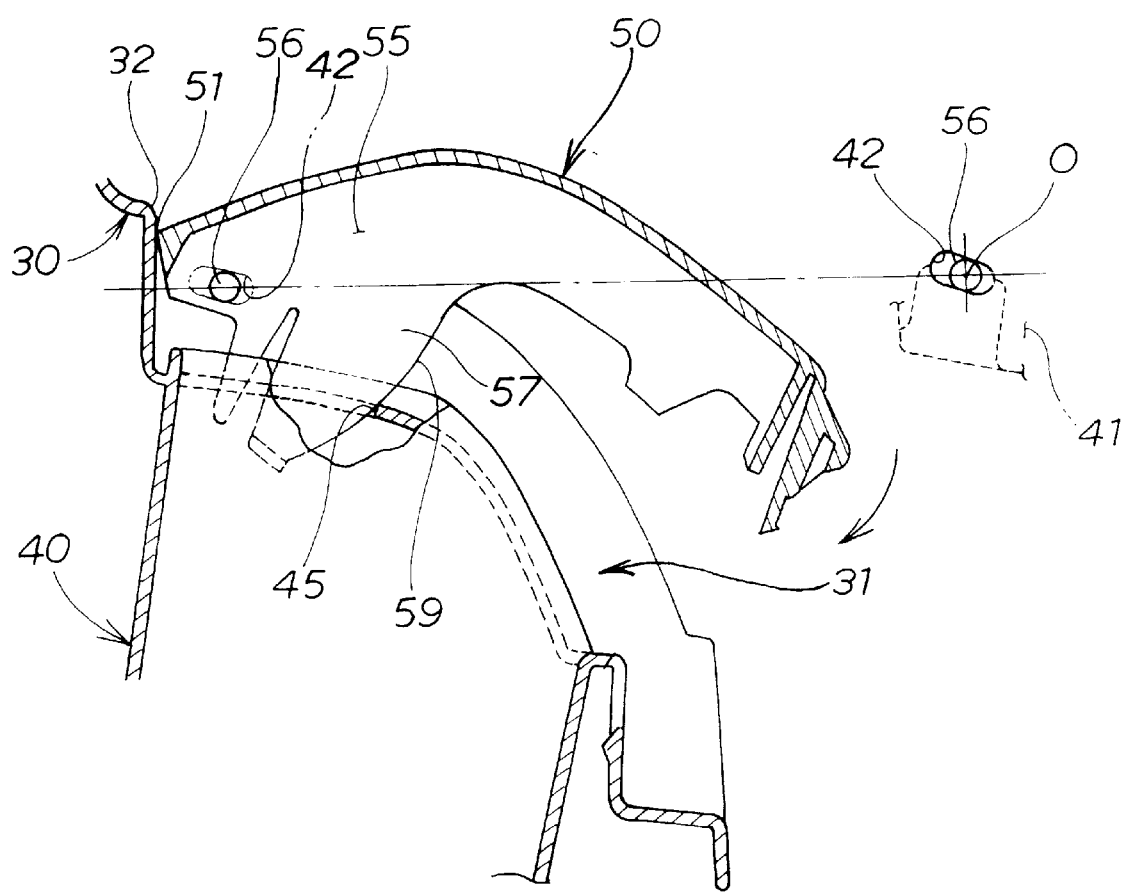
FIG. 10 shows the hinge center with the opened portion halfway closed by the lid.

FIG. 10 shows the lid 50 halfway closing the opened portion 31.

Figure 9:
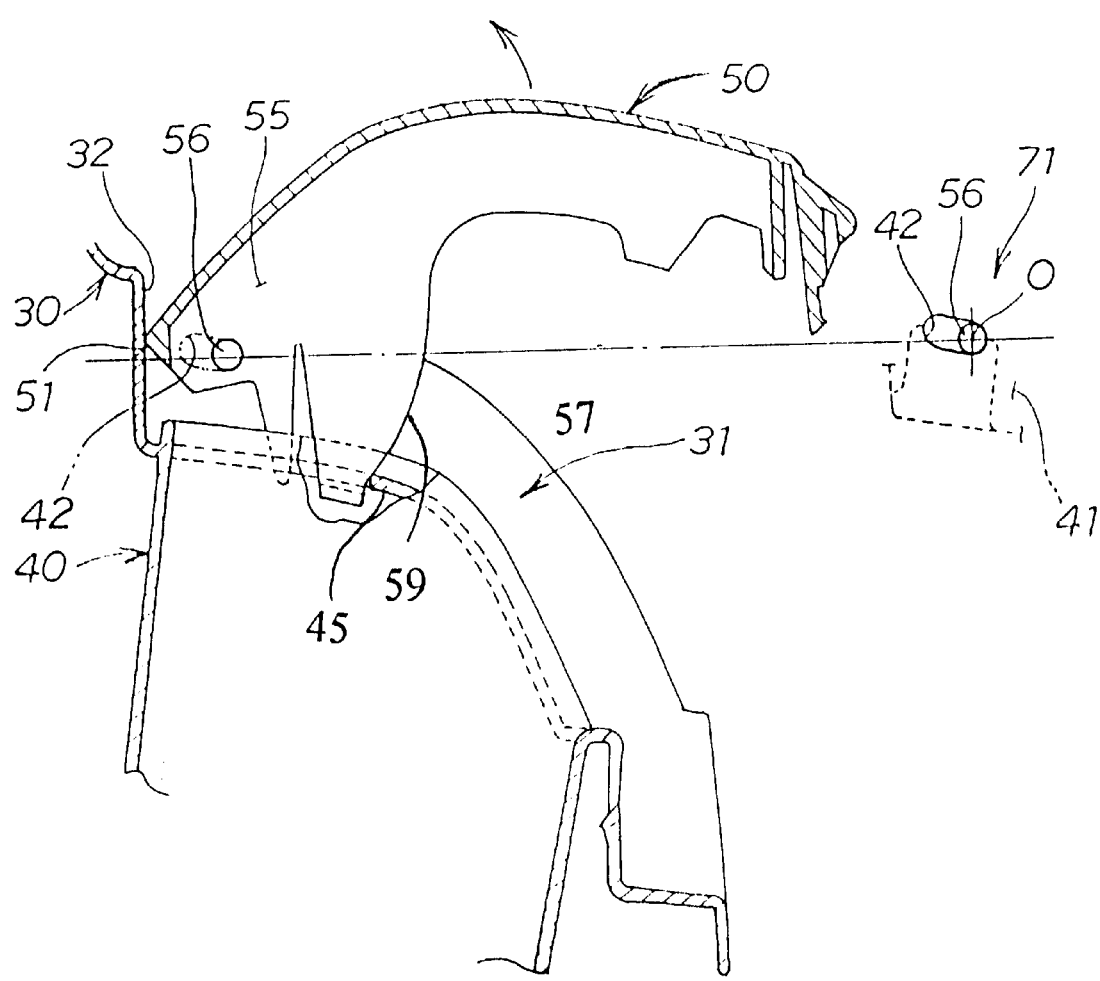
FIG. 9 shows the hinge center with the lid shown in a full open position.

When the lid 50 of FIG. 9 pivots to close the opened portion 31, the cam portion 59 of the stopper arm 57 formed on the side wall 55 of the lid 50 comes into abutment on the edge forming the through hole 45 to thereby move the hinge pin 56 within the long aperture 42 towards the opening edge 32 provided forwardly of the lid 50, as shown in FIG. 10. As a result, the lid 50 is pushed towards the opening edge 32. With this arrangement, a gap formed between the opening edge 32 and the lid edge 51 of the lid 50 when the lid 50 closes the opened portion 31, as shown in FIG. 8, can be made very small to thereby improve the waterproof property therebetween and enhance the appearance of the vehicle 1.

Operations of the lid 50, the stopper mechanism 72, and the retention mechanism 73 will be described with reference to FIG. 11A through FIG. 11C, FIG. 12A through FIG. 12C, and FIG. 13A through FIG. 13C.

Figure 11A:
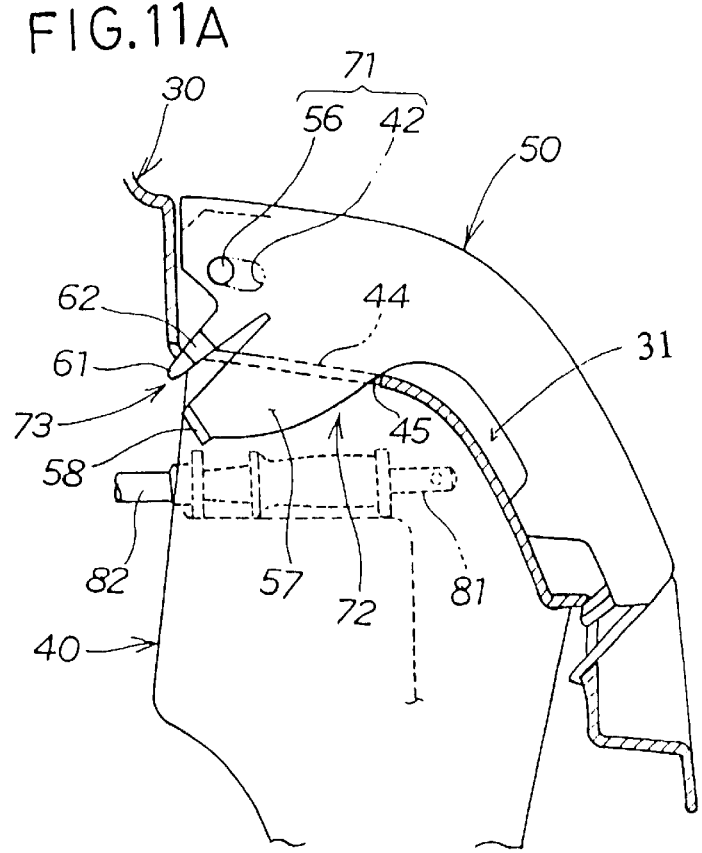
FIG. 11A shows the lid closing the opened portion.
Figure 11B:
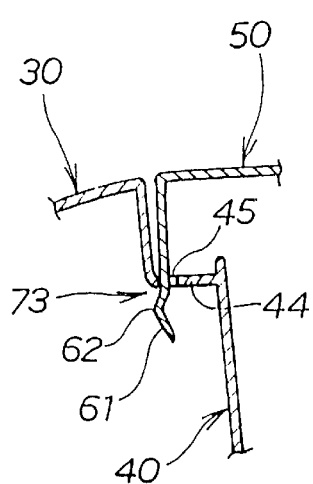
FIGS. 11B and 11C show the operations of a retention mechanism and a stopper mechanism, respectively, with the opened portion closed by the lid.
Figure 11C:
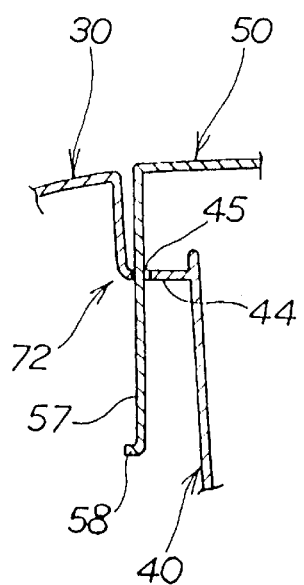

FIG. 11A illustrates the lid 50 fully closing the opened portion 31. When the opened portion 31 is fully closed by the lid 50, the retention mechanism 73 has the retention arm 61 passing through the through hole 45, and the retention portion 62 positioned below the horizontal sheet 44 forming the through hole 45, as shown in FIG. 11B. As shown in FIG. 11C, the stopper arm 57 passes through the through hole 45. The hook-shaped stopper portion 58 formed at the lower end of the stopper arm 57 is positioned below the horizontal sheet 44 forming the through hole 45.

Figure 12A:
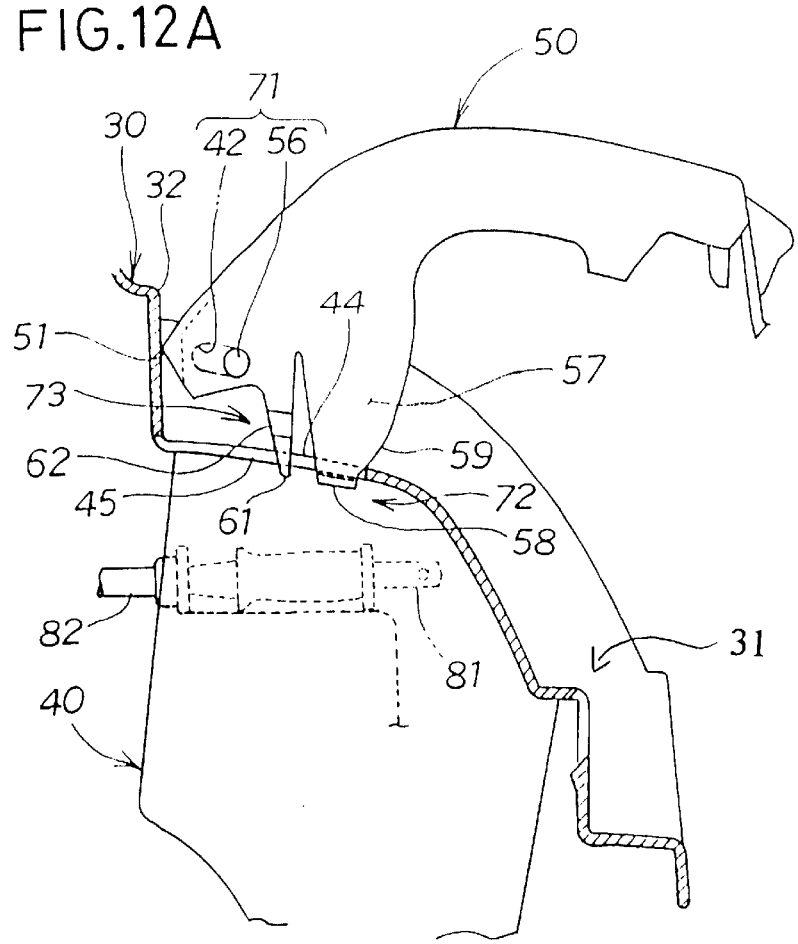
FIG. 12A shows the lid in the full open position.
Figure 12B:
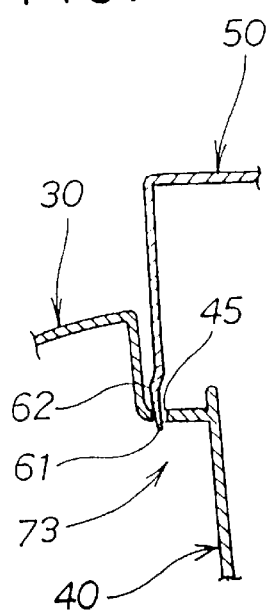
FIGS. 12B and 12C show the operations of the retention mechanism and the stopper mechanism, respectively, with the lid in the full open position.
Figure 12C:
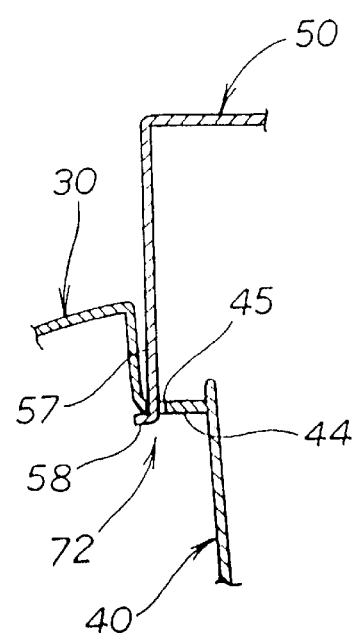

FIG. 12A shows the lid 50 fully opening the opened portion 31. As the lid 50 pivots towards the full open position, the lid 50 is lifted upwardly to thereby lift up the retention arm 61 forming the retention mechanism 73 as shown in FIG. 12B. Therefore, the dog-legged retention portion 62 formed at the retention arm 61 is positioned above the horizontal sheet 44 forming the through hole 45. Although the stopper arm 57 forming the stopper mechanism 72 is also lifted out of the through hole 45, the L-shaped stopper portion 58 is caught on the lower surface of the horizontal sheet 44 forming therein the through hole 45, as shown in FIG. 12C. Thus, the lid 50 is not lifted anymore.

Figure 13A:
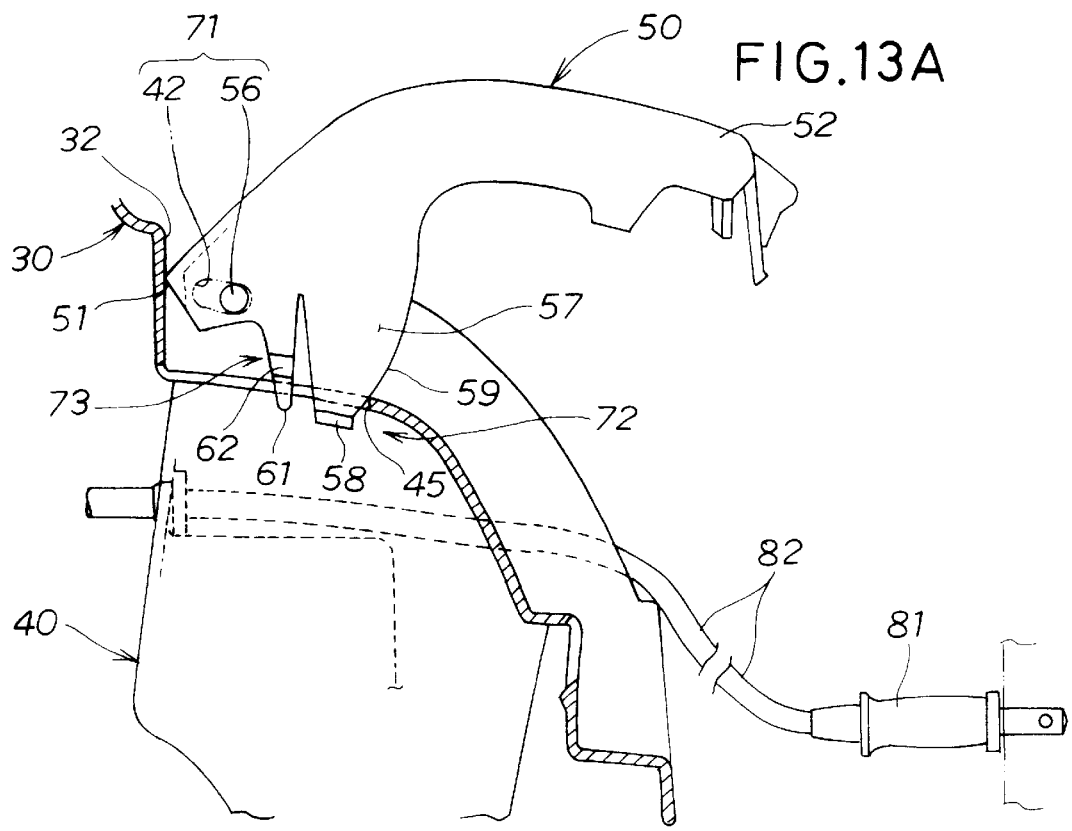
FIG. 13A shows the lid keeping the opened portion open.
Figure 13B:
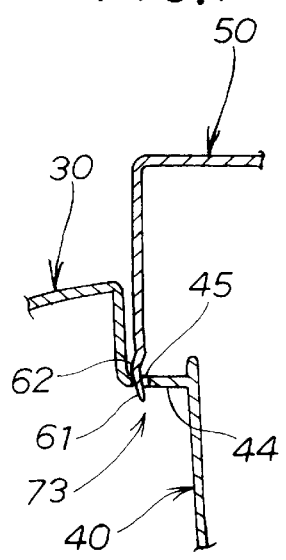
FIGS. 13B and 13C show the operations of the retention mechanism and the stopper mechanism, respectively, with the lid keeping the opened portion open.
Figure 13C:
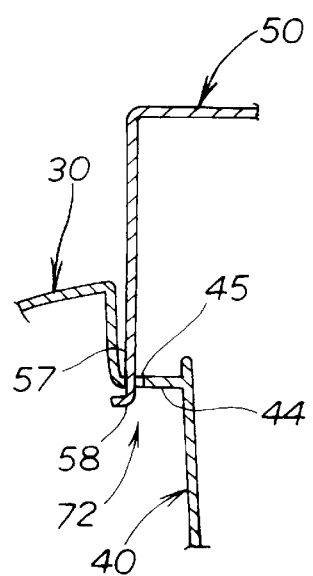

FIG. 13A illustrates the lid 50 held in a position close to the full open position. Since the retention portion 62 forming the retention mechanism 73 is elastically deformed to be locked by the edge forming the through hole 45, as shown in FIG. 13B, the lid 50 keeps the opened portion 31 open. With the opened portion 31 opened, baggage can be taken in and out of the storage box 40. When the electric cord 82 is drawn by pulling the attachment plug 81 out of the storage box 40 with the opened portion 31 opened, the battery 12 shown in FIG. 1 can be charged. With the lid 50 opening the opened portion 31, the stopper portion 58 forming the stopper mechanism 72 is in a position slightly lower than that of the horizontal sheet 44 forming the through hole 45 as shown in FIG. 13C.

The lid 50 in FIG. 13A pivots to close the opened portion 31 by pushing down the distal end portion 52 with hands. As the lid 50 pivots to close the opened portion 31, the retention arm 61 is elastically deformed to release the retention portion 62 from the edge forming the through hole 45. The retention portion 62 then passes through the through hole 45. Therefore, the retention portion 62 is pushed downwardly of the through hole 45. As a result, the opened portion 31 is closed by the lid 50, as shown in FIG. 11A.

Although the present invention has been described as being applied to the electric vehicle 1, the invention is also applicable to a hand-pushed or hand-drawn vehicle, an electric wheelchair, and an electric automobile driven by an electric motor.

In the illustrated embodiment, the rear cover 30 has the opening formed therein to provide the storage box 40. However, the front cover 21 or other cover of the vehicle 1 as well as the rear cover 30 may have such an opening formed therein.

A hinge mechanism may be provided at a rear part of the rear cover 30 such that the lid 50 opens and closes a front part of the rear cover 30.

Although each pair of the hinges 71, 71, stopper mechanisms 72, 72, and retention mechanisms 73, 73 is provided rightwardly and leftwardly of the vehicle 1 in the illustrated embodiment, they may be provided either rightwardly or leftwardly of the vehicle 1.

In the above-described embodiment, the hinge pin 56 forming the hinge 71 is provided on the side wall 55 of the lid 50. However, the present invention may be embodied to employ the hinge pin 56 provided on the side wall 41 of the storage box 40, and the long aperture 42 provided in the side wall 55 of the lid 50. A long shaft extending transversely of the electric vehicle 1 may be used in lieu of the hinge pins.

The stopper mechanisms may be altered such that a stop locking portion formed of the horizontal sheet 44 having the through hole is provided at a side part of the lid 50 while the stopper arm 57 is provided on a side part of the storage box 40.

It can also be appreciated that the retention locking portion provided by forming the through hole 45 may be provided at the side part of the lid 50 while the retention arm 61 may be provided at the side part of the storage box 40.

Obviously, various minor changes and modifications of the present invention are possible in the light of the above teaching. It is therefore to be understood that within the scope of the appended claims, the present invention may be practiced otherwise than as specifically described.

What is claimed is:

1. An electric vehicle propelled by an electric motor, comprising:

a cover member for covering a frame of the electric vehicle and defining an opening at a bent surface portion thereof;

a storage box communicating with an inside of the cover member through the opening; and a lid disposed along the bent surface portion of the cover member so as to open and close the opening by means of hinges;

wherein the hinges each comprise a hinge pin provided on a side wall of one of the lid or the storage box, and a long aperture formed in the side wall of the other one of the storage box or the lid, the long aperture extending along the lid and perpendicularly to the hinge pin, the hinge pin being fitted into the long aperture in such a manner as to rotate within the long aperture and slide in a longitudinal direction of the long aperture; and wherein a side wall of one of the storage box or the lid has a retention locking portion, the side wall of the other one of the lid or the storage box has an elastically deformable retention arm having a retention portion elastically deformed so as to be locked by the retention locking portion as the lid is opened, and the retention arm is locked by the retention locking portion to cause the lid to remain opened.

2. An electric vehicle propelled by an electric motor, comprising:

a cover member for covering a frame of the electric vehicle and defining an opening at a bent surface portion thereof;

a storage box communicating with an inside of the cover member through the opening; and a lid disposed along the bent surface portion of the cover member so as to open and close the opening by means of hinges;

wherein the hinges each comprise a hinge pin provided on a side wall of one of the lid or the storage box, and a long aperture formed in the side wall of the other one of the storage box or the lid, the long aperture extending along the lid and perpendicularly to the hinge pin, the hinge pin being fitted into the long aperture in such a manner as to rotate within the long aperture and slide in a longitudinal direction of the long aperture;

wherein a side wall of one of the storage box or the lid is provided with a stop locking portion for regulating a fully opened position of the lid, the side wall of the other one of the lid or the storage box is provided with a stopper arm having a stopper portion disposed to abut the stop locking portion when the lid is in the fully opened position, and the stop locking portion and the stopper portion cooperate with each other to set the fully opened position of the lid; and wherein the stop locking portion comprises an edge forming a through hole through which the stopper arm passes, and the stopper arm has a cam portion disposed to contact the edge forming the through hole as the lid is being closed to push the lid towards a proximal end thereof.

3. An electric vehicle propelled by an electric motor, comprising:

a cover member for covering a frame of the electric vehicle and defining an opening at a bent surface portion thereof;

a storage box communicating with an inside of the cover member through the opening; and a lid disposed along the bent surface portion of the cover member so as to open and close the opening by means of hinges;

wherein the hinges each comprise a hinge pin provided on a side wall of one of the lid or the storage box, and a long aperture formed in the side wall of the other one of the storage box or the lid, the long aperture extending along the lid and perpendicularly to the hinge pin, the hinge pin being fitted into the long aperture in such a manner as to rotate within the long aperture and slide in a longitudinal direction of the long aperture;

wherein a side wall of one of the storage box or the lid is provided with a stop locking portion for regulating a fully opened position of the lid, the side wall of the other one of the lid or the storage box is provided with a stopper arm having a stopper portion disposed to abut the stop locking portion when the lid is in the fully opened position, and the stop locking portion and the stopper portion cooperate with each other to set the fully opened position of the lid; and wherein the side wall of one of the storage box or the lid has a retention locking portion, the side wall of the other one of the lid or the storage box has an elastically deformable retention arm having a retention portion elastically deformed so as to be locked by the retention locking portion as the lid is opened and the retention arm is locked by the retention locking portion to cause the lid to remain opened.

4. An electric vehicle propelled by an electric motor, comprising:

a cover member for covering a frame of the electric vehicle and defining an opening at a bent surface portion thereof;

a storage box communicating with an inside of the cover member through the opening; and a lid disposed along the bent surface portion of the cover member so as to open and close the opening by means of hinges;

wherein the hinges each comprise a hinge pin provided on a side wall of one of the lid or the storage box, and a long aperture formed in the side wall of the other one of the storage box or the lid, the long aperture extending along the lid and perpendicularly to the hinge pin, the hinge pin being fitted into the long aperture in such a manner as to rotate within the long aperture and slide in a longitudinal direction of the long aperture; and wherein a side wall of one of the lid and the storage box has an arm extending therefrom, and a surface of the other one of the lid and the storage box has a through-hole formed therein for accommodating the arm therethrough, the arm having a portion which abuts the surface forming the through-hole when the lid is in a fully opened position to prevent further opening movement of the lid.

5. An electric vehicle propelled by an electric motor, comprising:

a cover member for covering a frame of the electric vehicle and defining an opening at a bent surface portion thereof;

a storage box communicating with an inside of the cover member through the opening; and a lid disposed along the bent surface portion of the cover member so as to open and close the opening by means of hinges;

wherein the hinges each comprise a hinge pin provided on a side wall of one of the lid or the storage box, and a long aperture formed in the side wall of the other one of the storage box or the lid, the long aperture extending along the lid and perpendicularly to the hinge pin, the hinge pin being fitted into the long aperture in such a manner as to rotate within the long aperture and slide in a longitudinal direction of the long aperture; and wherein a side wall of one of the lid and the storage box has an arm extending therefrom, and a surface of the other one of the lid and the storage box has a through-hole formed therein for accommodating the arm therethrough, the arm having an elastically deformable portion that is elastically deformed by the surface forming the through-hole as the lid is opened so that the arm is locked by the retention locking portion to cause the lid to remain opened.

6. An electric vehicle propelled by an electric motor and including a body frame, the electric vehicle comprising:

a cover member for covering the body frame, the cover member including a bent surface portion having an opened portion formed therein;

a storage box communicating with an inside of the cover member through the opened portion;

a lid disposed to extend along the bent surface of the cover member;

hinges for pivotably supporting the lid so that it can open and close the opened portion, the hinges each comprising a hinge pin provided on a side wall of one of the lid or the storage box, and an oblong aperture formed in the side wall of the other one of the storage box or the lid, the oblong aperture extending along the lid perpendicularly with respect to the hinge pin, the hinge pin being fitted into the oblong aperture in such a manner as to pivot within the oblong aperture and slide in a longitudinal direction of the oblong aperture;

a retention locking portion formed in the side wall of one of the storage box and the lid; and an elastically deformable retention arm formed in the side wall of one of the other one of the lid and the storage box, the retention arm having an elastically deformable retention portion that is elastically deformed so as to be locked by the retention locking portion as the lid is opened, the retention arm being locked by the retention locking portion to cause the lid to remain opened.

7. An electric vehicle according to claim 6; further comprising a stop locking portion formed in the side wall of one of the storage box or the lid for regulating a fully opened position of the lid; and a stopper arm formed in the side wall of the other one of the lid or the storage box, the stopper arm having a stopper portion disposed to abut the stop locking portion when the lid is in the fully opened position, and the stop locking portion and the stopper portion cooperate with each other to set the fully opened position of the lid.

8. An electric vehicle according to claim 7; wherein the stop locking portion comprises an edge forming a through-hole through which the stopper arm passes, and the stopper arm has a cam portion disposed to contact the edge forming the through-hole as the lid is being closed to push the lid towards a proximal end thereof.

9. An electric vehicle according to claim 8; wherein the retention locking portion is formed in the edge forming the through-hole.

10. An electric vehicle propelled by an electric motor and including a body frame, the electric vehicle comprising:
a cover member for covering the body frame, the cover member including a bent surface with an opened portion formed therein;
a storage box communicating with an inside of the cover member through the opened portion; and
a lid disposed to extend along the bent surface of said cover member;
hinges for pivotably supporting the lid such that it can open and close the opened portion, the hinges each comprising a hinge pin provided on a side wall of one of the lid or the storage box, and an oblong aperture formed in the side wall of the other one of the storage box or the lid, the oblong aperture extending along the lid perpendicularly to the hinge pin, the hinge pin being fitted into the oblong aperture in such a manner as to pivot within the oblong aperture and slide in a longitudinal direction of the oblong aperture;
a stop locking portion formed in the side wall of one of the storage box and the lid having for regulating a fully opened position of the lid;
a stopper arm formed in the side wall of one of the lid and said storage box, said stopper arm having a stopper portion disposed to abut against the stop locking portion when the lid is in the fully opened position, the stop locking portion and the stopper portion cooperating with each other to set the fully opened position of the lid;
a retention locking portion formed in the side wall of one of the storage box and the lid; and
an elastically deformable retention arm formed in the side wall of one of the lid and the storage box, the retention arm having a elastically deformable retention portion that is elastically deformed so as to be locked by the retention locking portion as the lid is opened, the retention arm being locked by the retention locking portion to cause the lid to remain opened.

11. An electric vehicle propelled by an electric motor and including a body frame, the electric vehicle comprising:
a cover member for covering the body frame, the cover member including a bent surface with an opened portion formed therein;
a storage box communicating with an inside of the cover member through the opened portion;
a lid disposed to extend along the bent surface of the cover member;
hinges for pivotably supporting the lid such that it can open and close the opened portion, the hinges each comprising a hinge pin provided on a side wall of one of the lid or the storage box, and an oblong aperture formed in the side wall of the other one of the storage box or the lid, the oblong aperture extending along the lid perpendicularly to the hinge pin, the hinge pin being fitted into the oblong aperture in such a manner as to pivot within the oblong aperture and slide in a longitudinal direction of the oblong aperture;
a stop locking portion comprising a through-hole formed in an edge of the side wall of one of the storage box and the lid for regulating a fully opened position of the lid; and
a stopper arm formed in the side wall of the other one of the lid and said storage box for passing through the through-hole, the stopper arm having a stopper portion disposed to abut against the stop locking portion when the lid is in the fully opened position, the stop locking portion and the stopper portion cooperating with each other to set the fully opened position of the lid, and the stopper arm having a cam portion disposed to contact the edge forming the through-hole as the lid is being closed to push the lid towards a proximal end thereof.

12. An electric vehicle propelled by an electric motor and including a body frame, the electric vehicle comprising:
a cover member for covering the body frame, the cover member including a bent surface with an opened portion formed therein;
a storage box communicating with an inside of the cover member through the opened portion; and
a lid disposed to extend along the bent surface of the cover member;
hinges for pivotably supporting the lid such that it can open and close the opened portion, the hinges each including a hinge pin provided on a side wall of one of the lid or the storage box, and an oblong aperture formed in the side wall of the other one of the storage box or the lid, the oblong aperture extending along the lid perpendicularly to the hinge pin, the hinge pin being fitted into the oblong aperture in such a manner as to pivot within the oblong aperture and slide in a longitudinal direction of the oblong aperture;
a stop locking portion formed in a side wall of one of the storage box and the lid for regulating a fully opened position of the lid;
a stopper arm formed in the side wall of the other one of the lid and the storage box, the stopper arm having a stopper portion disposed to abut against the stop locking portion when the lid is in the fully opened position, the stop locking portion and the stopper portion cooperating with each other to set the fully opened position of the lid;
a retention locking portion formed in the side wall of one of the storage box and the lid; and
an elastically deformable retention arm formed in the side wall of the lid and the storage box, the retention arm having an elastically deformable retention portion that is elastically deformed so as to be locked by the retention locking portion as the lid is being opened, the retention portion being locked by the retention locking portion to cause the lid to remain opened.

13. An assembly for mounting a lid to a storage compartment comprising: a slot formed in one of the lid and the storage compartment; and a projection extending from the other one of the lid and the storage compartment and being slidably pivotably disposed in the slot so that the lid is pivotable about the projection to open and close the storage compartment and the projection is slidable in the slot so that the lid abuts an edge of the storage compartment and is pushed away therefrom while the lid is being opened; wherein a side wall of one of the lid and the storage compartment has an arm extending therefrom, and a surface of the other one of the lid and the storage compartment has a through-hole formed therein for accommodating the arm therethrough, the arm having a portion which abuts the surface forming the through-hole when the lid is in a fully opened position to prevent further opening movement of the lid.

14. An assembly for mounting a lid to a storage compartment comprising: a slot formed in one of the lid and the storage compartment; and a projection extending from the other one of the lid and the storage compartment and being slidably pivotably disposed in the slot so that the lid is pivotable about the projection to open and close the storage compartment and the projection is slidable in the slot so that the lid abuts an edge of the storage compartment and is pushed away therefrom while the lid is being opened; wherein a side wall of one of the lid and the storage compartment has an arm extending therefrom, and a surface of the other one of the lid and the storage compartment has a through-hole formed therein for accommodating the arm therethrough, the arm having an elastically deformable portion that is elastically deformed by the surface forming the through-hole as the lid is opened so that the arm is locked by the retention locking portion to cause the lid to remain opened.

15. An assembly for mounting a lid to a storage compartment comprising: a slot formed in one of the lid and the storage compartment; a projection extending from the other one of the lid and the storage compartment and being slidably pivotably disposed in the slot so that the lid is pivotable about the projection to open and close the storage compartment and the projection is slidable in the slot so that the lid abuts an edge of the storage compartment and is pushed away therefrom while the lid is being opened; a first arm extending from a side wall of one of the lid and the storage compartment; and a second arm extending from a side wall of one of the lid and the storage compartment; wherein a surface of the other one of the lid and the storage compartment has a through-hole formed therein for accommodating the first and second arms therethrough, the first arm has a portion which abuts the surface forming the through hole when the lid is in a fully opened position to prevent further opening movement of the lid, and the second arm has an elastically deformable portion that is elastically deformed by the surface forming the through-hole as the lid is opened so that the second arm is locked by the retention locking portion to cause the lid to remain opened.

* * * * *